H. W. WOLFF.
TANK CAR.
APPLICATION FILED MAR. 1, 1909.
943,803.
Patented Dec. 21, 1909.
2 SHEETS—SHEET 1.
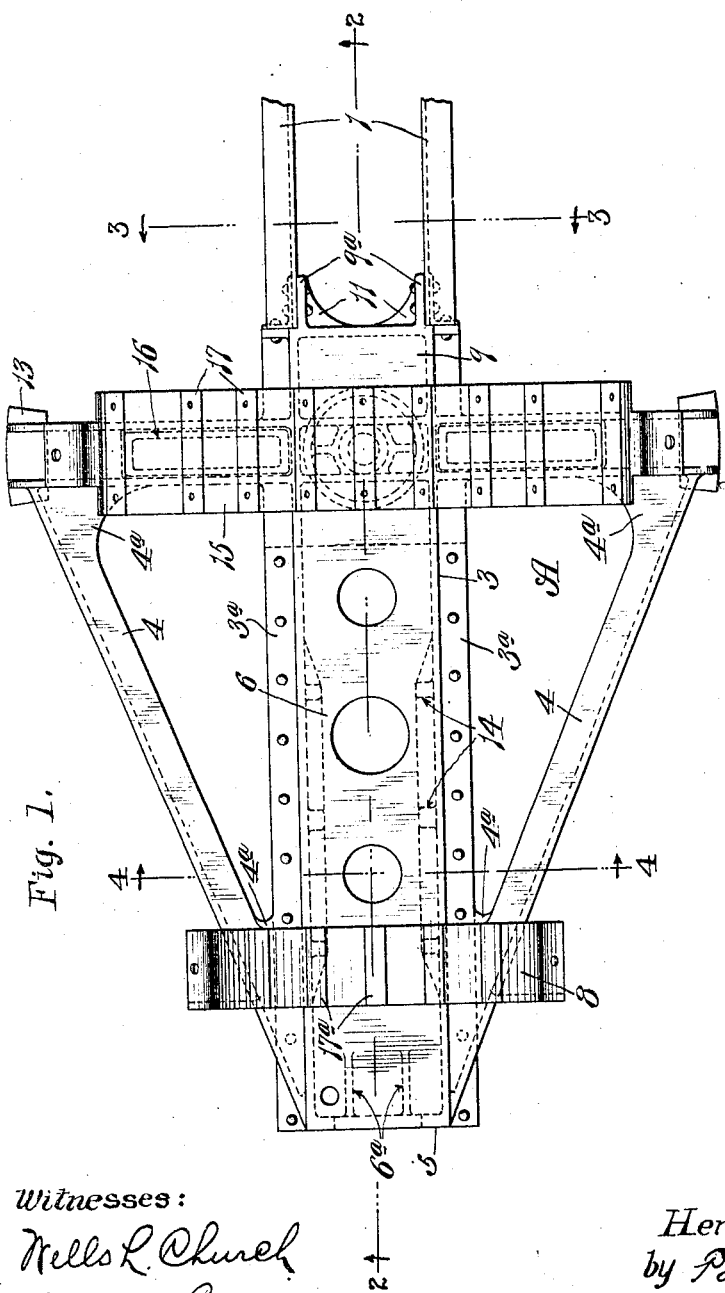
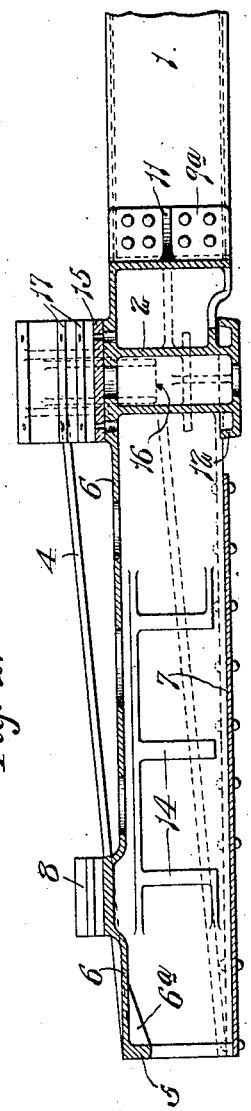
Witnesses:
Wells R. Church
George Ladson
Inventor:
Herbert W. Wolff
by Paul Bakewell
Atty.

H. W. WOLFF.
TANK CAR.
APPLICATION FILED MAR. 1, 1909.
943,803.
Patented Dec. 21, 1909.
2 SHEETS—SHEET 2.
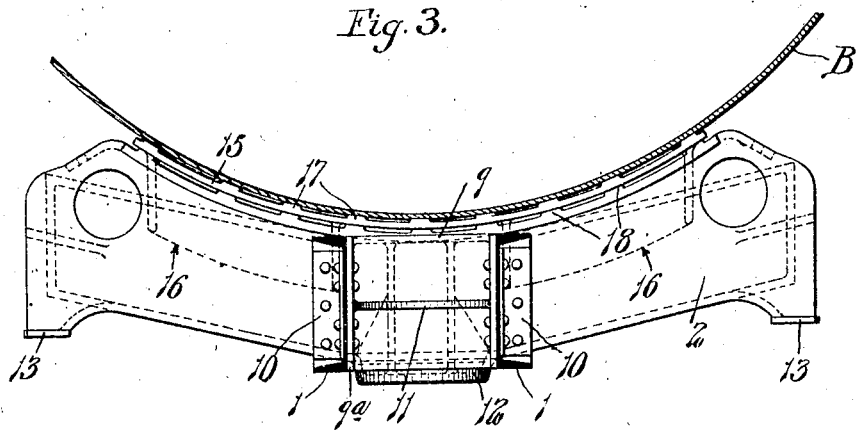
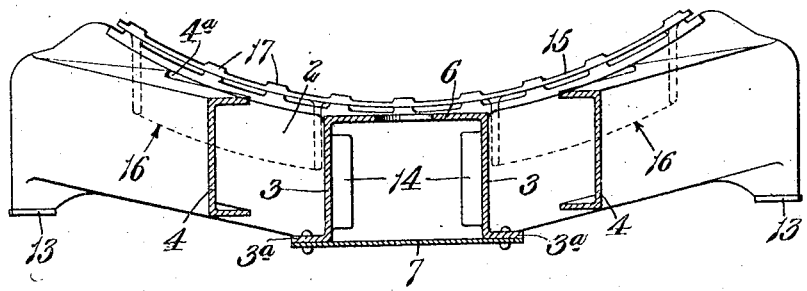
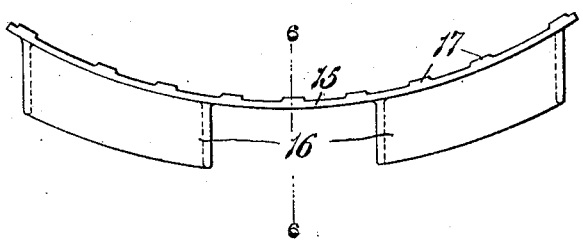
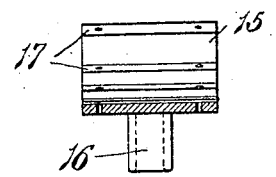
Witnesses:
Wells L. Church
George Ladson
Inventor:
Herbert W. Wolff
by Paul Bakewell
Atty.

UNITED STATES PATENT OFFICE.

HERBERT W. WOLFF, OF ST. LOUIS, MISSOURI, ASSIGNOR TO AMERICAN CAR & FOUNDRY COMPANY, OF ST. LOUIS, MISSOURI, A CORPORATION OF NEW JERSEY.

TANK-CAR.

943,803.  Specification of Letters Patent.  Patented Dec. 21, 1909.

Application filed March 1, 1909. Serial No. 480,698.

*To all whom it may concern:*

Be it known that I, HERBERT W. WOLFF, a citizen of the United States, residing at St. Louis, Missouri, have invented a certain new and useful Improvement in Tank-Cars, of which the following is a full, clear, and exact description, such as will enable others skilled in the art to which it appertains to make and use the same.
This invention relates to tank cars, and particularly to the underframes of such cars.

One object of my invention is to provide a tank car comprising a tank, an underframe for supporting said tank, and coöperating means of novel construction on the tank and underframe located adjacent the bolsters of the underframe for preventing the tank from shifting longitudinally or transversely.

Another object is to provide a tank car underframe comprising two end portions or sections, each of which consists of a bolster, draft sills and inclined brace members cast as a single unit, and a center sill connecting said end sections together.
Another object is to provide a tank car in which the members of the underframe on which the tank rests are so constructed that they can be fitted easily to the tank and thus produce a perfect bearing for the tank.
Another object is to provide a tank car comprising a tank provided on its under side with anchorage members, and an underframe provided with bolsters having sockets into which said anchorage members project, thus enabling the tank to be lifted bodily off the underframe or mounted thereon easily.

Other objects and desirable features of my invention will be hereinafter pointed out.

Figure 1 of the drawings is a top plan view of a portion of a tank car underframe embodying my invention; Fig. 2 is a vertical longitudinal sectional view taken on approximately the line 2—2 of Fig. 1; Fig. 3 is a transverse sectional view taken on the line 3—3 of Fig. 1, looking in the direction of the arrow, a portion of the tank being shown in this view; Fig. 4 is a transverse sectional view taken on the line 4—4 of Fig. 1, looking in the direction of the arrow;
Fig. 5 is an elevational view of one of the tank anchorage members which is permanently connected to the tank; and Fig. 6 is a vertical sectional view taken on the line 6—6 of Fig. 5.

Referring to the drawings which illustrate the preferred form of my invention, A designates a cast metal member, preferably cast steel, that forms one of the end portions or sections of my improved underframe, and 1 designates a pair of center sill members that connect the two end sections A of the frame together. Each of the end sections A of the frame consists of a bolster 2, draft sills 3, diagonal brace members 4 that converge inwardly from the outer ends of the bolster to the end portions of the draft sills, and a buffer block 5 provided with an opening through which the drawbar of the draft gear projects, all of said parts being integrally connected together. The bolster 2 may be of any preferred shape in cross section but I prefer to make it in the form of a hollow box girder. The draft sills are preferably of L-shape in cross section arranged with their horizontal flanges $3^a$ projecting outwardly and having the upper ends of their vertical legs connected together by an integral web 6 which performs the same function as the top cover plate that is usually connected to the draft sills of an underframe. A bottom cover plate 7 is connected to the lower flanges $3^a$ of the draft sills by rivets or suitable fastening devices, as shown in Figs. 1, 2 and 4, thus producing an approximately box-shaped draft sill member that is integrally connected to the bolster. The buffer block or plate 5, through which the drawbar extends, is integrally connected to the draft sills and to the web 6 which ties said draft sills together, and gussets $6^a$ are located at the point where the buffer block is connected to said web so as to reinforce and strengthen the same. The diagonal brace members 4 that extend from the bolster to the draft sills, are preferably of channel-shape in cross section, as shown in Fig. 4, and are arranged with their horizontal flanges projecting inwardly toward the longitudinal center of the car, said horizontal flanges being flared at $4^a$ where they connect with the bolster and draft sills so as to form gussets which insure a strong and rigid structure. The bolster 2 curves downwardly intermediate its ends, as shown in Figs. 3 and 4, so that it will conform to the shape of the tank B and as the diagonal members 4 are connected to the end portions of the bolster said diagonal members will incline downwardly, as shown in Fig. 2, instead of lying in the same horizontal plane as the draft sills.

A tank support 8 which is cast integral with the horizontal web 6 of the draft sill portion of the underframe, projects laterally from the opposite sides of said draft sill portion, and the top face of said support is concaved or shaped so that it will conform to the under side of the tank which rests on same. The bolster 2 is provided on its rear side with an integral portion 9 to which the center sill members 1 are connected, said portion 9 comprising flanges 9ª that project between the center sill members 1, the ends of which butt against the end face of said portion 9. I prefer to use separate angle irons 10 for connecting the center sill members to the integral portion 9 on the bolster, said angle irons being riveted to the end face of the portion 9 and also to the vertical webs of the bolster members, which vertical webs lie between said connecting irons and the flanges 9ª on the portion 9. I also prefer to reinforce the flanges 9ª by means of a cross web 11 that is integrally connected to said flanges and to the member 9 from which said flanges project.

The bolster 2 is provided on its under side with an integral center bearing 12 and side bearings 13, as shown in Fig. 3, and the draft sills 3 are provided with integral lugs 14 that coöperate with the follower plates of the draft rigging, not shown.

The tank B which rests on the underframe, is provided on its under side with anchorage members, one of which is shown in Figs. 5 and 6, and the bolsters are so constructed that said anchorage members will fit inside of same, thus enabling the tank with its anchorage members to be built as a single unit and then placed on the underframe, the anchorage members on the tank dropping into the bolsters and thus securely retaining the tank in position without the aid of rivets or other fastening devices. Each of these anchorage members comprises a curved portion 15 that conforms to the shape of the under side of the tank, and provided with depending projections 16 that pass through slots or openings in the top of the bolster. I prefer to provide the curved portion 15 of the anchorage member with raised ribs 17 that can be chipped off or planed down so as to provide a perfect bearing for the tank and, if desired, the tank supports 8 can be provided with similar raised ribs 17ª. I also prefer to provide the upper side of the bolster with similar chipping ribs 18 that can be planed down so as to produce a uniform bearing surface for the anchorage member on the bolster. The anchorage members are permanently connected to the tank and as the lugs or projections 16 on said anchorage members fit inside of the bolsters, it will be impossible for the tank to shift longitudinally or transversely. These lugs 16 are located on opposite sides of the longitudinal center of the car, as shown in Figs. 3 and 4, and as said lugs are comparatively large and have an extended bearing surface on the bolster, the tank will be securely anchored in position without the aid of a direct connection between the tank and underframe.

A car of the construction above described is strong and rigid and can be built at a low cost owing to the fact that the bolster, diagonal braces and draft sills at each end of the frame are cast as a single unit. Such a construction is also very desirable because it overcomes the necessity of using fastening devices between the tank and underframe, and it provides a substantial bearing and anchorage for the tank at the bolsters of the underframe.

Having thus described my invention, what I claim as new and desire to secure by Letters Patent is:

1. In a tank car, an underframe provided with bolsters, a removable tank resting freely on said underframe, and members connected to the tank on opposite sides of the longitudinal center of the frame and projecting into pockets in the bolsters for preventing the tank from shifting longitudinally.

2. In a tank car, an underframe provided with a bolster, a removable tank resting freely on said underframe, and a rigid lug or projection on said tank that fits in a socket or recess in the bolster to prevent longitudinal movement of the tank.

3. In a tank car, an underframe provided with a bolster, a removable tank resting freely on said underframe, and rigid members depending from the tank and engaging the bolster on opposite sides of the longitudinal center of the car for preventing the tank from shifting longitudinally.

4. In a tank car, a tank provided with a rigid projection, and a bolster constructed to receive said projection so as to prevent the tank from shifting longitudinally of the underframe of the car, said projection having no direct connection with the bolster.

5. In a tank car, a removable tank provided on its under side with lugs or projections, and an underframe provided with bolsters which have pockets that receive said lugs or projections when the tank is mounted on the underframe and thus prevent the tank from shifting longitudinally.

6. In a tank car, an underframe provided with bolsters, a tank resting freely on said bolsters, and anchorage members on said tank having portions that project into recesses or pockets in said bolsters to prevent said tank from shifting.

7. In a tank car, an underframe provided with bolsters, a tank provided on its under side with anchorage members that rest on the top faces of said bolsters, and lugs or projections on said anchorage members that extend into openings in the tops of the bolsters for preventing the tank from shifting longitudinally.

8. In a tank car, an underframe provided with a bolster whose top face is slightly concaved, a tank provided on its under side with an anchorage member that conforms to the top face of the bolster and rests thereon, and depending lugs on said anchorage member arranged on opposite sides of the longitudinal center of the underframe and projecting through openings in the top face of the bolster so as to prevent the tank from shifting longitudinally.

9. In a tank car, a tank, an underframe provided with metal supports for said tank, and integral ribs or projections on said supports that can be chipped off or planed down so as to provide a perfect bearing surface for the tank.

10. In a tank car, a tank, and a metallic anchorage member connected to said tank, said anchorage member being provided with integral ribs or projections that can be cut away so as to cause said member to conform accurately to the exterior of the tank.

11. In a tank car, a tank provided with an anchorage member having raised ribs or surfaces that can be chipped off or smoothed down so as to make said member embrace the tank snugly, an underframe provided with a supporting surface on which said anchorage member rests, and raised ribs on said supporting surface that can be planed down so as to produce a perfect bearing surface for said anchorage member.

12. A tank car provided with an underframe which consists of two cast metal end sections and a center sill connecting said sections together, a tank supported by said end sections, and projections on said tank that fit in pockets in said end sections so as to prevent the tank from shifting.

13. In a tank car, an underframe comprising two cast metal sections, each of which consists of a bolster, draft sills, and inclined brace members integrally connected together, a center sill connecting said end sections, and a tank resting freely on said end sections and provided with projections that fit in recesses in said end sections so as to prevent displacement of the tank.

14. A tank car underframe provided with a bolster, a draft sill, and a tank support all integrally connected together and formed of cast metal, the tank support being located intermediate the bolster and the outer end of the draft sill and arranged in a higher horizontal plane than the top face of the draft sill.

15. A tank car underframe having a cast metal member which comprises a bolster whose upper surface is curved so as to conform approximately to the shape of the tank, draft sills integrally connected to said bolster and provided at their outer ends with an integral buffer block, inclined brace members integrally connected to said bolster and draft sills and converging inwardly from the outer ends of the bolster, and a curved tank support integrally connected to said draft sills.

16. In a tank car underframe, a cast member comprising a bolster, an approximately inverted channel-shaped portion integrally connected to said bolster to form a draft sill member, inclined braces integrally connected to said draft sill member and to the bolster, and a tank support integrally connected to the horizontal web of said inverted channel-shaped portion.

17. An underframe member for cars, said member consisting of a bolster, draft sills, a tank support, a buffer block, and inclined brace members all cast together as a single unit.

18. In a tank car, an underframe consisting of a center sill, cast metal members connected to the ends of said center sill and each consisting of a bolster, draft sills and a tank support, and a tank resting on the bolsters and tank supports of said end sections.

19. In a tank car underframe, a cast metal member comprising a bolster, an approximately inverted channel-shaped member integrally connected to said bolster and provided at its outer end with an integral buffer block, a tank support on said channel-shaped member, channel-shaped brace members extending from the outer end of said draft sill member to the ends of the bolster, the horizontal flanges of said brace members being flared at the points where said flanges connect with the bolster and draft sill member, a center bearing and side bearings formed integral with said bolster, a bottom cover plate connected to the under side of the draft sill member, and an integral portion on the rear side of the bolster to which a center sill can be connected.

20. In a car underframe, a cast metal bolster provided on its rear side with a projecting portion having vertically disposed flanges, center sill members connected to said flanges and abutting against said projecting portion, an approximately inverted channel-shaped member integrally connected to the bolster and provided at its front end with a buffer block, and brace members integrally connected to the bolster and draft sill members and converging inwardly from the ends of the bolster.

21. In a tank car, an underframe provided with bolsters, a tank resting freely on said underframe, and lugs on said tank which project downwardly into pockets formed in said bolster to prevent longitudinal displacement of the tank.

22. In a tank car, an underframe provided with a plurality of tank supports, a tank carried by said supports, and lugs on said tank that coöperate with openings in one of said supports to prevent the tank from shifting longitudinally of the underframe.

23. In a tank car underframe, a pair of end members, each of which consists of a bolster, a tank support, draft sills, and diagonal braces cast as a single unit, a tank resting freely on said end members, and means on said tank and said end members for preventing the tank from shifting longitudinally and transversely.

24. In a tank car, the combination of a tank provided with rigid lugs on the under side thereof, and an underframe provided with bolsters having openings in the top faces thereof for receiving said lugs.

25. In a tank car, an underframe comprising two end castings provided with depressions and connected together by means of center sills, a tank resting freely on said underframe, and lugs rigidly secured to the under side of said tank and adapted to project downwardly into the depressions in the end castings so as to prevent displacement of the tank.

In testimony whereof I hereunto affix my signature in the presence of two witnesses, this twenty seventh day of February 1909.

HERBERT W. WOLFF.

Witnesses:
WELLS L. CHURCH,
GEORGE BAKEWELL.